W. L. BALDRIDGE.
PLANT PROTECTOR.
APPLICATION FILED OCT. 29, 1908.
936,401.
Patented Oct. 12, 1909.
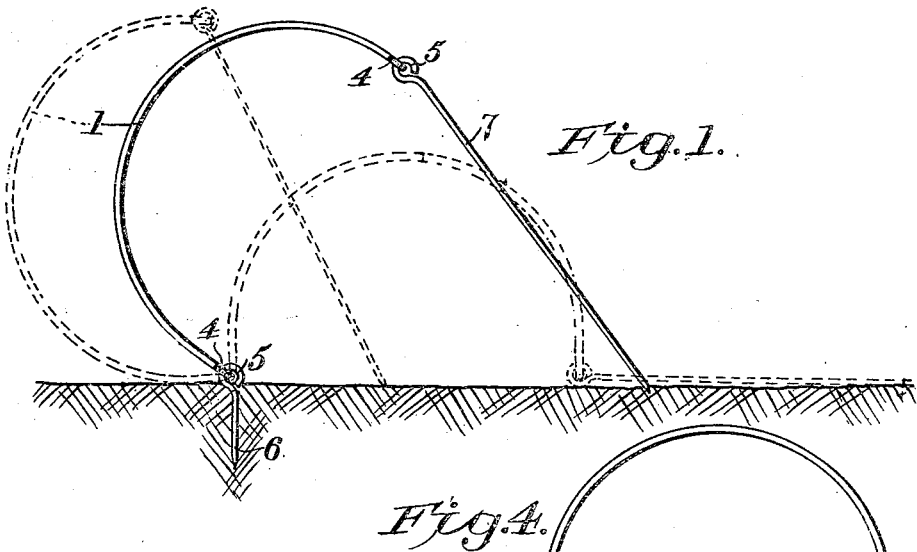
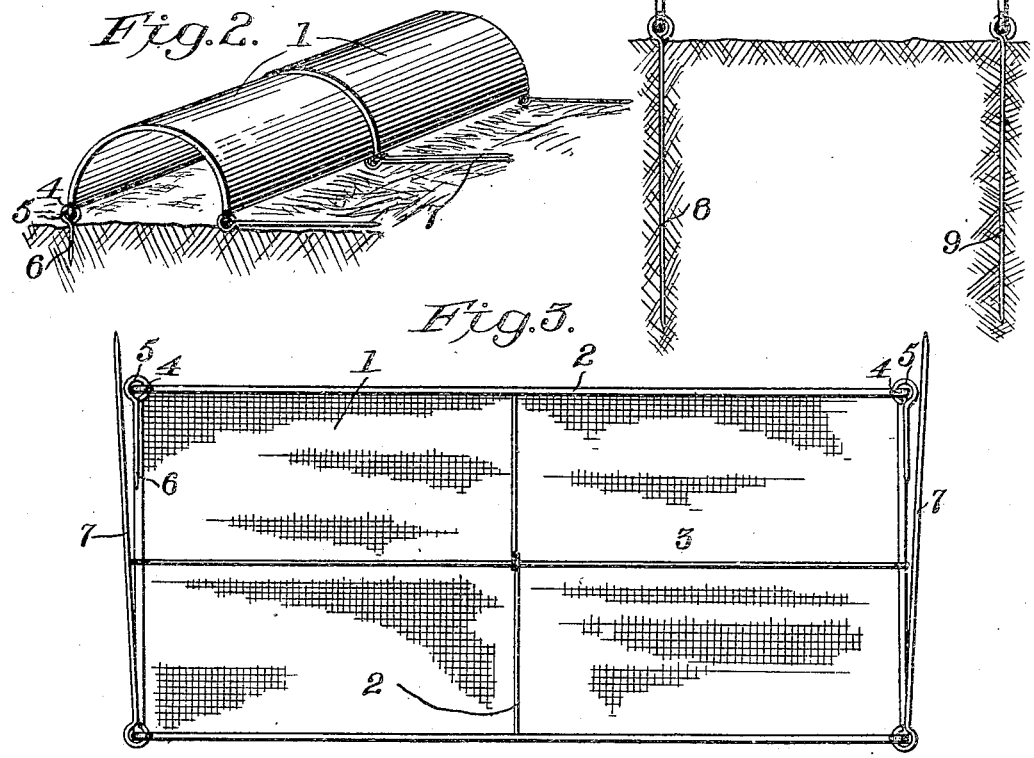
WITNESSES
INVENTOR
William L. Baldridge
by H. H. Doolittle
Attorney

UNITED STATES PATENT OFFICE.

WILLIAM L. BALDRIDGE, OF WINTER GARDEN, FLORIDA.

PLANT-PROTECTOR.

936,401.

Specification of Letters Patent. Patented Oct. 12, 1909.

Application filed October 29, 1908. Serial No. 460,134.

*To all whom it may concern:*

Be it known that I, WILLIAM L. BALDRIDGE, a citizen of the United States, residing at Winter Garden, in the county of Orange and State of Florida, have invented certain new and useful Improvements in Plant-Protectors, of which the following is a specification.

My invention relates to plant protectors and its object is to provide a device of this kind of very simple and cheap construction and yet impervious to frost and capable of being adjusted to different positions to uncover the plants or to serve merely as a wind shield, without necessitating the removal of the anchoring pins from the ground and having means whereby the protector may be firmly held in any adjusted position.

With these ends in view, my invention is embodied in preferable form, in the device hereinafter described and illustrated in the accompanying drawings.

In these drawings, Figure 1 is a side view in elevation, showing the protector in different positions; Fig. 2, is a perspective view showing two overlapping protectors; Fig. 3, is a bottom plan view and Fig. 4, is an end view of a modification.

Referring to the drawings, 1 is the body of the cover, which is made of some suitable cheap textile material, preferably cotton, obtaining economy in manufacture and light weight, whereby the protector may be readily placed in position and easily adjusted. This textile material is impregnated with a suitable pore-filling and preservative compound, preferably cactus-juice and the extract of oak bark, the former serving to fill the pores of the material whereby it is rendered impervious to frosts and chilling winds and the oak bark extract serving to preserve the material from mildew. This cover body is stretched over a frame 2, preferably of wire and which may be made of one piece. This frame is arch-shaped in cross-section. Connecting the ends of the frame is a separate longitudinal brace rod 3.

At the two corners of one side of the frame are formed integrally in the wire of the frame, eyes 4, with which are adapted to loosely engage the eyes or hooks 5, of anchoring pins or posts 6, also preferably of metal. A pivotal connection is thus provided between the anchoring pins and the body of the cover, whereby after the pins have been inserted into the ground, the cover may be swung on the latter to close down over the plants as shown in dotted lines in Fig. 1 or swung to the half-way position shown in full lines in Fig. 1 or entirely back so as to rest on the upper surface of the protector, as shown in the last position to the left in dotted lines in the same figure. On the opposite side of the frame are pivotally connected another set of pins 7, longer than the first set 6 and adapted to form adjusting brace pins which are of sufficient length to engage the ground and maintain the protector in upright position when the same is adjusted to the middle position of Fig. 1.

When it is desired to completely cover the plants so as to protect them from the frost, the anchoring pins on one side of the protector are driven into the ground and the arched body then swung down over the plants, leaving the opposite pins flat on the ground. When it is desired to uncover the plants the protector is merely swung back on the pins as pivots to the full position shown at the extreme left in dotted lines in Fig. 1, which leaves the plants exposed. If it is desired to merely shield the plants from a wind without covering them from the sun then the protectors are tilted up into the intermediate position shown in Fig. 1, the opposite double sets of anchoring pins permitting the cover to be turned in either direction. In this position the black or other dark colored material of the protector which is stained such color by the application of the liquid compound, absorbs the heat and by its proximity to the plant tends to warm the plants which is a desirable feature in growing young plants in the winter months.

If it is merely desired to use the device as a flat shield for bleaching celery, for instance, the wire frame may be readily flattened out and the protector mounted in the position shown in the intermediate view in Fig. 1.

In Fig. 4, the pins 8 and 9 of the opposite sets of the frame there shown are of the same length and of sufficient length to enable either set of pins to be employed as props or adjusting braces when the protector is tilted to the side position, so that with this construction the protector may be turned up on edge on either side and one set of pins will serve as the anchoring means and the other set as the adjusting braces.

It is clear that various changes in the details of forming the frame and in the material of the body of the protector and the mode of filling the pores of the cover and coloring the same may be adopted without departing from the principles of my invention.

Having thus described my invention, what I claim is,

1. A plant protector having pins fixed in the ground, said pins at their upper ends being pivotally connected to the protector frame, whereby the protector may swing thereon, and brace-pins pivotally connected to the frame and adapted to be placed in a position to hold the frame raised.

2. A plant protector having a rigid frame, anchoring pins fixed in the ground and brace-pins pivotally connected directly to the frame and adapted to maintain the frame in raised position.

3. A series of independently adjustable plant protectors adapted to be swung on pivotally connected pins fixed in the ground and brace-pins pivotally connected to the frame for maintaining the frame in a position to expose the plant.

4. A series of independently adjustable plant protectors having anchoring pins fixed in the ground and adapted to be swung on said pins to raised position, and pivoted pins for maintaining the frame in raised position without removing the anchoring means from the ground.

5. A plant protector having a rigid frame, a cover of textile material thereon, anchoring pins fixed in the ground and pivotally connected to the frame, said frame adapted to be swung in the arc of a circle to cover or expose the plant.

6. A plant protector having a rigid frame, a cover thereon, pins fixed in the ground and pivotally connected to the frame on one side to anchor the frame, said frame adapted to swing on said fixed pins to expose the plants, and pivotally connected adjusting brace-pins connected to the lower edges of the frame.

7. A plant protector having a frame, anchoring pins and adjusting brace-pins, said anchoring pins and adjusting brace pins pivotally connected to the lower edges of the frame.

In testimony whereof I affix my signature in presence of two witnesses.

WILLIAM L. BALDRIDGE.

Witnesses:
   Jos. H. Blackwood,
   H. P. Doolittle.